A. B. WROTH.
Level.
No. 163,561. Patented May 18, 1875.
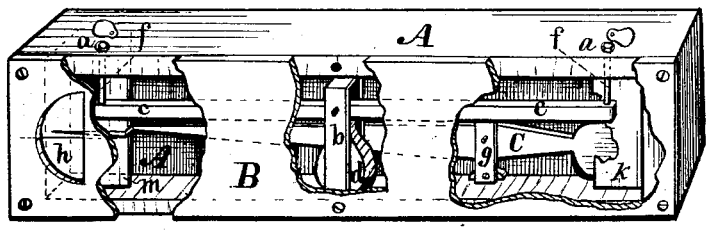

UNITED STATES PATENT OFFICE.

ALFRED B. WROTH, OF WINTERSET, IOWA, ASSIGNOR OF TWO-THIRDS HIS RIGHT TO E. G. BARKER AND GEORGE ATKINSON, OF SAME PLACE.

IMPROVEMENT IN LEVELS.

Specification forming part of Letters Patent No. 163,561, dated May 18, 1875; application filed August 10, 1874.

*To all whom it may concern:*

Be it known that I, ALFRED B. WROTH, of Winterset, in the county of Madison and State of Iowa, have invented a Combined Level and Plumb, of which the following is a specification:

My invention consists in mounting, combining, and inclosing levers and weights in such a manner that they will operate automatically by force of gravity, to be used alternately for leveling and plumbing.

My drawing is a perspective view, illustrating the construction and operation of my invention.

A A represent an oblong box or case, which may be formed of wood or metal in any suitable manner, and vary in dimensions, as desired. B B is a cover for the same case, showing parts broken away to exhibit the mechanism inside of the case. $a\ a$ are small openings in the top and near the ends and front edges of the case A. The level pointers or indicators rise and descend therein. $b$ is one of the central upright bearers, between which is mounted and pivoted a horizontal beam to form two equal levers, $c\ c$. The uprights $b$, bearing the levers $c$, may be rigidly attached to the case A or its cover B in any suitable manner. $d$ is a weight rigidly attached to the middle and under side of the beam forming the two levers $c\ c$ and keeps them balanced. $f\ f$ are pointers or indicators rigidly attached at the ends of the levers $c$ to extend vertically through openings $a\ a$ in the top of the case A. They screw into the levers and are adjustable. When the case rests on a perfect level the top of the indicators $f$ will both be even with the top surface of the case, and the weight $d$, balancing the levers $c\ c$, will retain them in that position. In any deviation from a perfect level the weight $d$ will tilt the beam or levers $c\ c$, and cause one of the pointers $f$ to rise and the other to descend.

A simple and complete leveling-instrument is thus produced and operated by a positive law of nature.

C is the short and weighted arm of a lever pivoted between upright bearings $g$, secured in the right-hand portion of the case A. The long arm of this lever C terminates at the left end of the case in a forked indicator, the points of which are visible from opposite sides of the case, through windows $h$. $k$ is a vertical division-plate to guide and steady the weighted end of the lever C. Suitable stops may be attached to this plate, or to the case, to limit the motion of the weight, or the cavity in the case may conform to the shape of the weight and circumscribe its movements. $m$ is a dial-plate marked on each side in such a manner that the positions of the plumb-indicators, relative to the marks will be shown through the windows $h$.

When used for plumbing the case A is held upright, and the weighted end of the lever C will bring the pointers at its upper end into a perfect perpendicular position, and in direct line with the central vertical marks on the dial-plate $m$, when the case A and the wall or object against which it rests is perfectly plumb. Any deviation from a perpendicular line will be indicated by the pointers standing off from the marks on the dial.

A complete plumbing-instrument, automatically operated by the law of gravitation, is thus formed and inclosed with the leveling-instrument, so that the mechanism of both instruments is protected from all outside influences that could interfere with their correct and true operations and indications if they were exposed.

Suitable covers and stops can be attached to close the openings $a$ in the case A, and thereby lock the level so that it will be inoperative.

A spring or other suitable device may be connected with the lever C to arrest its oscillations whenever desired.

I am aware that levers and weights are commonly used for leveling and plumbing, and that combined leveling and plumbing instruments have been made; but I claim as new and advantageous my manner of forming, mounting, and arranging two independent weighted beams or levers in a case to form a complete instrument that can be alternately used for leveling and plumbing.

I claim as my invention—

The leveling-beam $c\ c$, having a central pendent weight, $d$, and vertical indicators $f f$ at its ends, when mounted and arranged in the case A, having openings $a\ a$, and provided with the plumbing-lever C, substantially as and for the purposes shown and described.

ALFRED B. WROTH.

Witnesses:
RICHD. GASTON,
J. M. ANDREWS.